FIG. 1 SYMBOLS
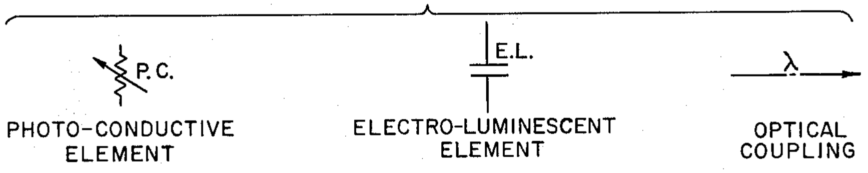
FIG. 2A
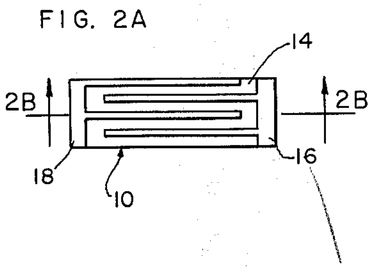
FIG. 2B
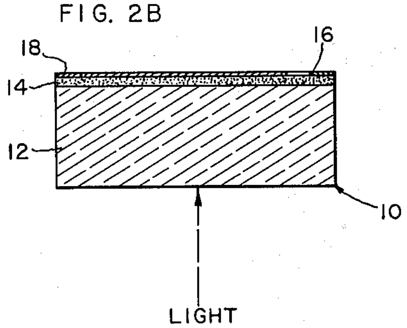
FIG. 3A, FIG. 3B
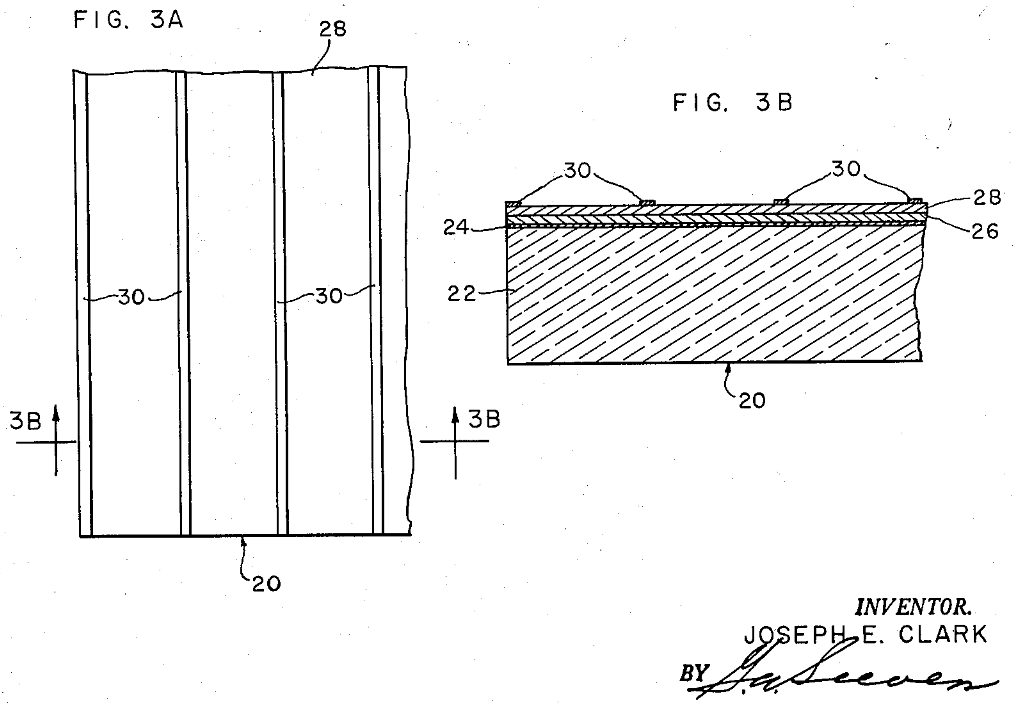
INVENTOR.
JOSEPH E. CLARK
BY [signature]
ATTORNEY FIG. 6
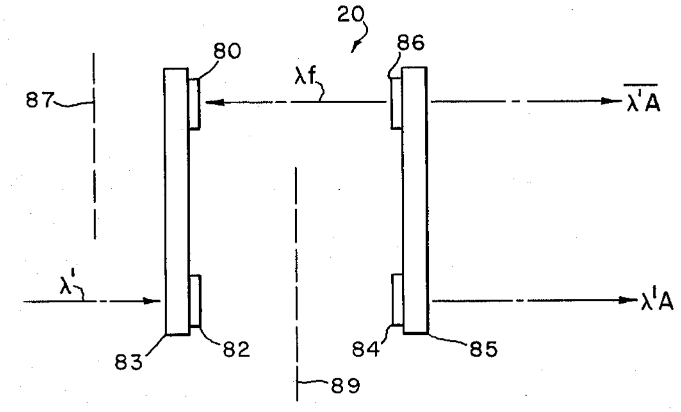
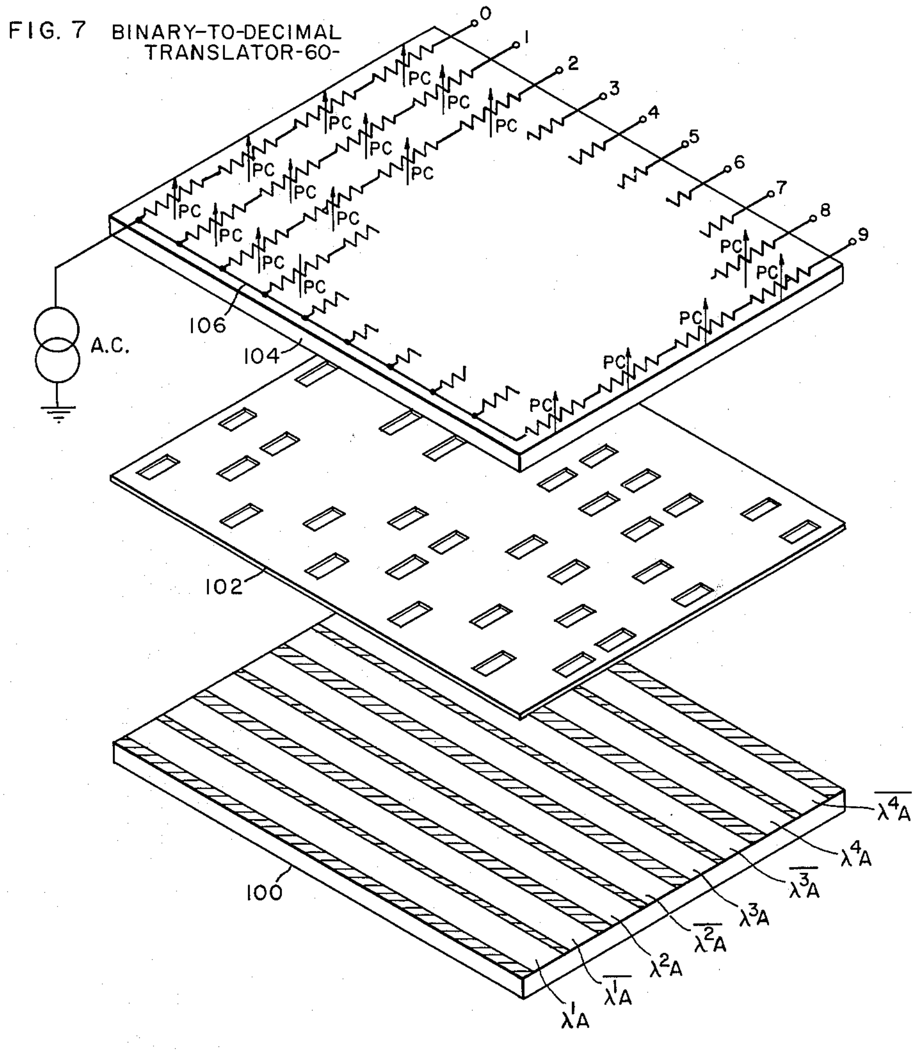
FIG. 7 BINARY-TO-DECIMAL TRANSLATOR-60-

Sept. 21, 1965 J. E. CLARK 3,207,907

ELECTROLUMINESCENT-PHOTOCONDUCTIVE TAPE READER AND DISPLAY SYSTEM

Filed March 5, 1962 5 Sheets-Sheet 4

| DECIMAL OUTPUT OF UNIT 60 (FIG. 4) | CONNECTION TO AN ELECTRO-LUMINESCENT STRIP ON SUBSTRATE -200- (FIG. 8) IN RECTANGLES AS MARKED "X" | | | | | | | |
|---|---|---|---|---|---|---|---|---|
| | 202 | 204 | 206 | 208 | 210 | 212 | 214 | 216 |
| 0 | X | X | X | X | X | X | | |
| 1 | | | | | | | X | |
| 2 | X | X | | X | | X | | X |
| 3 | X | | X | X | | X | | X |
| 4 | | | | | X | | X | X |
| 5 | X | | X | | X | X | | X |
| 6 | X | X | X | | X | X | | X |
| 7 | X | | X | X | | | | |
| 8 | X | X | X | X | X | X | | X |
| 9 | X | | X | X | X | X | | X |

United States Patent Office 3,207,907
Patented Sept. 21, 1965

3,207,907

ELECTROLUMINESCENT-PHOTOCONDUCTIVE TAPE READER AND DISPLAY SYSTEM

Joseph E. Clark, Costa Mesa, Calif., assignor to General Precision, Inc., a corporation of Delaware Filed Mar. 5, 1962, Ser. No. 177,340
8 Claims. (Cl. 250—213)

The present invention provides an improved read-out and display system for use, for example, in conjunction with a punched tape containing binary data, or with any other appropriate binary data source. The read-out and display system of the invention is used for converting the data from the source into a decimal code which, in turn, may be used to control an appropriate type of numeric, alphanumeric or other display device.

The read-out and display system to be described is capable of translating binary-coded, tape-punched data into a visual display. The system of the invention can accept punched-tape data, for example, from a teletype unit. The system may also be coupled to other sources of data through tape-output devices which have information codes that are compatible with the system. Embodiments of the invention may be employed, for example, at meteorlogical data-analyzing stations, at airport reservation stations or other transportation control centers, and in a variety of other fields of use.

The read-out and display system of the present invention utilizes the phenomena of photo-conductance and electro-luminescence to achieve its objectives.

As is well known, photo-conductance is the term applied to the characteristic displayed by certain non-metallic substances when they are exposed to electromagnetic radiation. This photoconductive characteristic constitutes a marked decrease in electric resistance of the substance and corresponding increase in its electrical conductivity upon such exposure. The electromagnetic radiation causing this characteristic to manifest itself may lie in any part of the spectrum from the infra red to the X-ray or gamma ray region. Specifically, photo-conductance relates to the resistive change which occurs when such materials as CdS or CdSe absorb photons.

The desired photoconductive effect in the system of the invention to be described may be achieved, for example, by cadmium-selenium photoconductors such as presently marketed by the National Semiconductor Company, and designated by them as NSL–3. This particular photoconductor employs a rectangular comb-like construction.

As is also well known, electro-luminescence is the production of light emission in certain solid state materials, such as, ZnS:Cu or ZnS:Mn by the application of an electric field across the substance. This electroluminescent effect differs from other common means of light production in that electrical energy is converted into light without an intermediate energy-production stage. That is, the production of electroluminescent light is achieved without the usual step of first converting electrical energy into heat energy. The electric field applied to the electroluminescent material to produce the electroluminescent effect may be an alternating current field, so that alternating current exciting potentials can be used in the system producing such a field.

The present invention utilizes the electroluminescent and the photoconductive phenomena in conjunction with one another to achieve the desired results of the present invention, that is, to provide an improved system which will accept binary data and convert it, in a manner to be described, to a numeric decimal display, or to any other appropriate type of display.

An important element in the system of the present invention is an electroluminescent photoconductive translator. In the embodiment to be described, for example, this translator is composed of a number of spaced parallel strips of electroluminescent material mounted on a suitable substrate and formed into a plurality of individual rectangular elements. The translator to be described also includes a plurality of comb-shaped rectangular photoconductive elements respectively disposed in the path of any light emitted by the corresponding rectangular groups of electroluminescent elements.

The electroluminescent elements are selectively activated by input logic, and the resulting light therefrom passes to the correpsonding photoconductive elements to change the electrical characteristics of the corresponding photoconductive elements.

An important feature of the read-out and display system of the present invention is the provision of an improved type of electroluminescent photoconductive system in which the transfer and decoding of the binary input data is accomplished entirely by the use of electroluminescent photoconductive logic and by alternating current excitation only.

The use of alternating current excitation eliminates the need for the usual alternating-current to direct-current power conversion, which was necessary in most of the prior art systems generally used for converting and displaying binary data. This consequently simplifies the system of the present invention, as compared with the usual direct current types of prior art systems.

Another feature of the invention is the use of regenerative effects in the electroluminescent/photoconductive system so as to achieve a display memory. This simple expedient, as will be described, eliminates the need for the usual piror art elaborate and costly memory systems.

A general object of the invention, therefore, is to provide an improved electroluminescent/photoconductive system which is capable of providing a visual display of the input data fed into the system.

Another object is to provide such a system having improved and simplified memory capabilities.

Other objects and advantages of the invention will become apparent upon a consideration of the following description, when taken in conjunction with the accompanying drawings, in which:

FIGURE 1 is a schematic representation of certain symbols to be used in the drawings;

FIGURE 2A is a plan view of a typical known photoconductive unit;

FIGURE 2B is a cross-sectional view, substantially on the line 2B—2B, of the photoconductive unit of FIGURE 2A;

FIGURE 3A is a plan view of a typical electroluminescent unit;

FIGURE 3B is a cross-sectional view substantially on the line 3B—3B, of the unit of FIGURE 3A;

FIGURE 6 is a schematic representation of a photoconductive-electroluminescent inverter for use in the system of FIGURE 4;

FIGURE 7 is a perspective, exploded view of a photoconductive-electroluminescent binary-to-decimal translator for use in the system of FIGURE 4;

Figure 4:
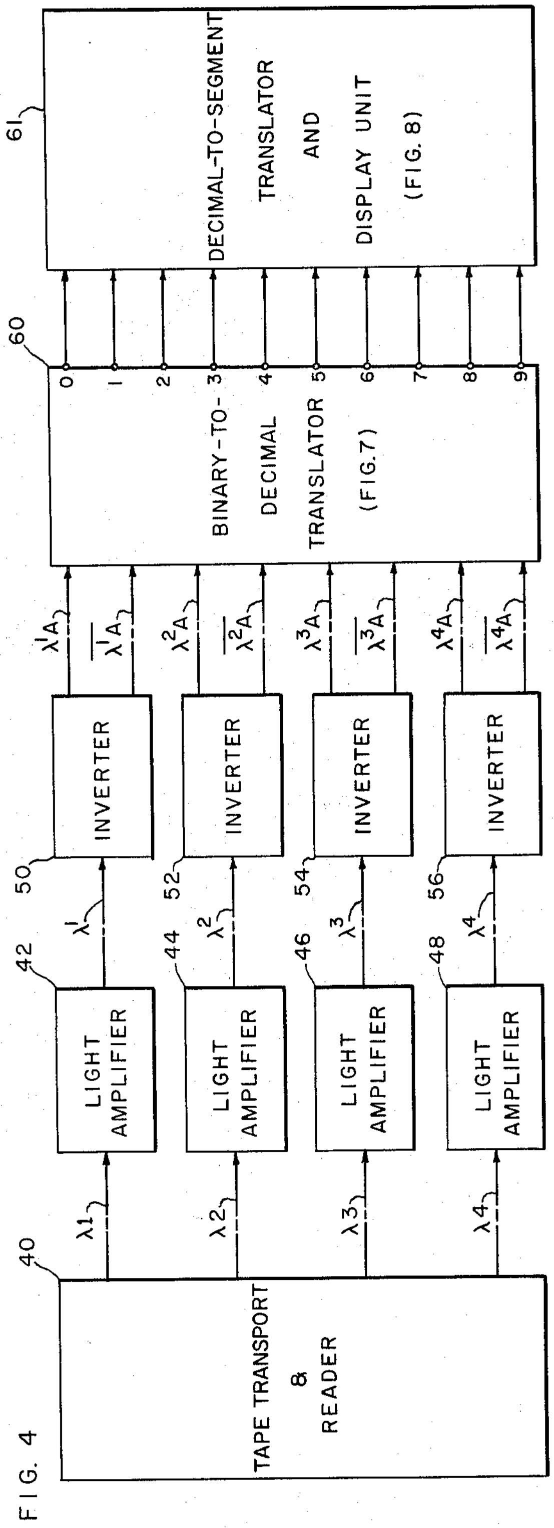
FIGURE 4 is a block diagram of a system representative of one embodiment of the invention.

The embodiment of the invention to be described is composed of two major sections, namely, a tape reader and a logic-display unit. A suitable transistor power supply may be used to provide excitation voltage for the display unit. This excitation voltage, in the embodiment to be described, is an alternating-current voltage, and it may be of the order of 200 volts at 600 c.p.s., for example. The data-input, logic and display functions are accomplished in the system to be described entirely by electrooptical techniques. One advantage of such a system, as mentioned above, is that the need for expensive alternating-current to direct-current converters is obviated, such converters being required when conventional diode or transistor logic is used.

The general principle of operation of the system to be described is that the electroluminescent elements generate optical signals which control the electrical switching characteristics of the photoconductive elements which, in turn, control other electroluminescent elements in a logical manner.

Specifically in the system to be described, a particular electroluminescent element produces straight binary-coded optical signals from a punched tape. Electroluminescent-photoconductive amplifiers amplify the optical signals, and the amplified optical signals control an electroluminescent-photoconductive system. The latter system converts the binary-coded optical signals into complemented binary-coded optical signals. The latter signals control an "and" type of electroluminescent-photoconductive network which, in turn, translates the binary-coded data into decimal form. The resulting decimal data is then translated into segmented form for visual display to the operator in easily interpreted geometrical patterns.

In the symbols of FIGURE 1, the photoconductance elements in the schematic drawings of this application will be represented by the variable resistance symbol, with the initials P.C. adjacent thereto. Likewise, the electroluminescent elements to be illustrated in the drawings herein will be represented by the usual capacitor symbol with the initials E.L. adjacent thereto. The optical coupling between the various elements in the system will be represented by a dashed arrow, as shown in FIGURE 1, with a designation $\lambda$ over the arrow.

A typical photoconductive element is shown in FIGURE 2A and 2B and designated generally as 10. The photoconductive element 10 includes a substrate 12 which may be formed of quartz, glass or any other appropriate substance which, preferably, is transparent. A layer 14 of photoconductive material such as cadmium and sulphur, or cadmium and selenium is applied over the substrate 10 in any appropriate known manner.

A first electrode 16 is then formed over the layer 14, as is a second electrode 18. The electrodes 16 and 18 may be formed, for example, by vapor deposition and they may be formed of a suitable conductive material, such as gold.

As shown in FIGURE 2A, for example, the electrodes 16 and 18 have a comb-like configuration, and are interleaved with respect to one another. This permits light to be incident on the photoconductive layer 14 from the top of the element through the comb-like segments of the electrodes 16 and 18. Light can also be incident on the photoconductive layer 14 through the transparent bottom 12.

In the absence of light, the resistance offered by the photoconductive layer 14 between the electrodes 16 and 18 is relatively high. However, should a beam of light fall on the photoconductive layer between any of the comb-like portions of the electrodes 16 and 18, the resistance of the layer 14 drops to a relatively low value, which is exhibited by a relatively low resistance between the electrodes 16 and 18.

A typical electroluminescent element is designated 20 in FIGURES 3A and 3B. This element includes a transparent substrate 22 composed, for example, of glass. A layer of $SnO_2$ designated 24, is deposited on the glass substrate 22. This layer forms an electrically conductive transparent electrode for the element. A layer 26 of ZnS:Cu in a urea-formaldehyde binder is then deposited over the transparent electrode layer 24, and a further layer 28 composed of $BaTiO_3$ is deposited over the layer 26. A plurality of electrically conductive strip electrodes 30 are deposited over the layer 28. The strip electrodes 30 may, for example, be composed of gold.

When an alternating-current electric field is applied across the transparent electrode 24 and any one of the strip electrodes 30, the electroluminescent material between the selected electrodes 30 and the common electrode 24 luminesces, so that a strip of light having the configuration of the activated electrodes 30 is emitted through the transparent substrate 22.

The photoconductive element 10 of FIGURES 2A and 2B, and the electroluminescent element 20 of FIGURES 3A and 3B may be formed in any usual manner. The elements described herein represent typical known elements that may be used in the system of the invention to achieve the objectives thereof.

The system shown schematically in FIGURE 4 includes a tape transport and reader which is indicated generally as 40. This tape transport and reader may be any well known type. For example, binary data to be translated and displayed by the system of the invention may be recorded in usual manner on a punched paper tape. The punched paper tape may be read by subjecting it to a plurality of light beams. At each subsequent position of the tape, the presence or absence of a particular light beam indicates whether or not a punch corresponding to that light beam appears at that particular reading position.

In the system of FIGURE 4, for example, it is assumed for purposes of explanation that the binary data on the tape is represented by the presence or absence of four distinct apertures in the tape. In the reader 40, four light beams designated $\lambda 1$, $\lambda 2$, $\lambda 3$ and $\lambda 4$ are directed at the tape, and the presence or absence of the respective holes for each position of the tape are represented by the light signals $\lambda 1$, $\lambda 2$, $\lambda 3$ and $\lambda 4$ in FIGURE 4.

When any one of these light signals has a predetermined maximum amplitude, i.e. is "on," the existence of a corresponding punch in the tape is indicated. Conversely, when any one of these light signals has minimum, or zero amplitude, i.e. is "off," the absence of a corresponding punch is indicated.

In the system of FIGURE 4, the light signals $\lambda 1$, $\lambda 2$, $\lambda 3$ and $\lambda 4$, are introduced to respective light amplifiers 42, 44, 46 and 48. The light signals produced at the outputs of the respective amplifiers are designated $\lambda'$, $\lambda^2$, $\lambda^3$, $\lambda^4$, respectively. These amplified light signals are applied to respective inverters 50, 52, 54 and 56.

Each of the inverters 50, 52, 54 and 56 performs a complementing function and produces a pair of output light signals in response to each input optical signal. For example, the inverter 50 produces output light signals $\lambda'_A$ and $\bar{\lambda}'_A$. The first of these two output light signals is true when the amplified input signal $\lambda'$ has maximum amplitude, and the other of these output light signals is true when the input light signal $\lambda'$ has minimum, or zero amplitude.

Likewise, the inverter 52 produces output light signals $\lambda^2_A$ and $\bar{\lambda}^2_A$ which are controlled by the input signal $\lambda^2$; the inverter 54 produces output signals $\lambda^3_A$ and $\bar{\lambda}^3_A$ which are controlled by the signal $\lambda^3$; and the inverter 56 produces output signals $\lambda^4_A$ and $\bar{\lambda}^4_A$ which are controlled by the input signal $\lambda^4$.

The complemented light output signals from the inverters 50, 52, 54 and 56 are applied to a binary-to-decimal translator 60. The binary-to-decimal translator 60 is constructed, in a manner to be described in conjunction with FIGURE 7, to respond to different patterns of the input of the complemented input light signals to produce corresponding output signals at its output terminals. The output terminals of the binary-to-decimal translator 60 are designated 0–9, and an electrical signal is produced at a particular output terminal to represent the decimal equivalent of a corresponding predetermined pattern of input light signals. The electrical signals produced at the output terminals are applied to a decimal-to-segment translator to be described in conjunction with FIGURE 8.

Figure 5:
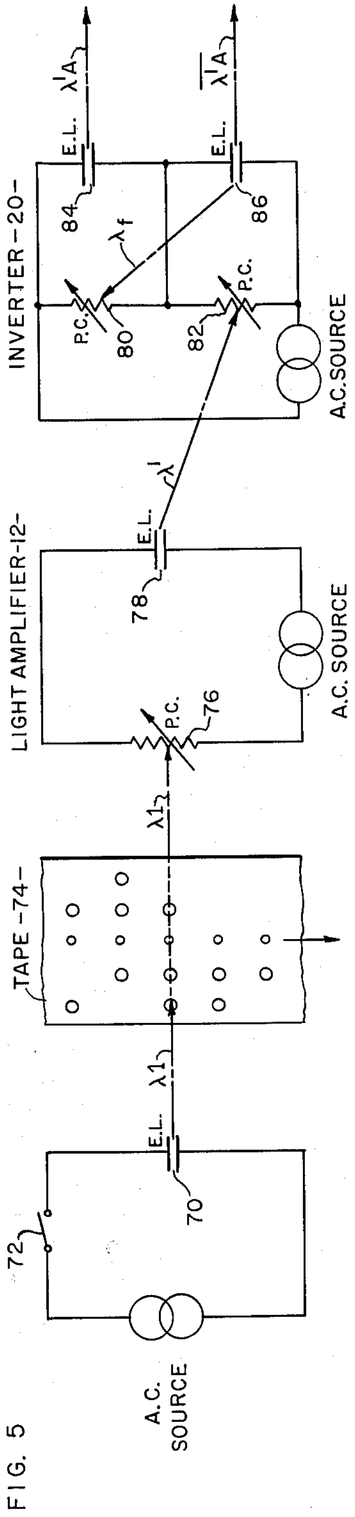
FIGURE 5 is a schematic diagram, partly in block form, of one of the components of the system of FIGURE 4.

The representation of FIGURE 5 shows in somewhat more detail the various components in the path to which the light signal $\lambda_1$ of FIGURE 4 is initially introduced. It will be appreciated that the other light paths in FIGURE 4 may be similarly constituted.

As shown in FIGURE 5, the tape reader may include an electroluminescent element 70 which is connected in series with a switch 72 across an appropriate alternating-current source. When the switch 72 is closed, the element 70 is caused to luminesce, and the light from the element 70 is directed to one side of a tape 74.

The tape 74 has the binary data recorded on it, as mentioned, and in the particular embodiment, this information is represented by the presence or absence of four punches across the tape for each reading position of the tape.

Whenever a punch in the tape appears at the $\lambda_1$ position, the resulting $\lambda_1$ light signal has maximum amplitude, and that signal is directed to a photoconductive element 76 in the light amplifier 12. This causes the resistance of the photoconductive element 76 to decrease, so that an electroluminescent element 78 connected in series therewith across an appropriate alternating-current source is caused to luminesce.

The resulting amplified light signal $\lambda'$ from the electroluminescent element 78 in the light amplifier 12 is introduced to the inverter 20, as mentioned above, for complementing purposes.

As shown in FIGURE 5, the inverter 20 includes a pair of photoconductive elements 80 and 82 connected across the alternating-current source. The photoconductive element 80 is shunted by an electroluminescent element 84, and the photoconductive element 82 is shunted by an electroluminescent element 86.

The inverter 20 is constructed, as will be described, so that a feedback light signal $\lambda_f$ from the electroluminescent element 86 is directed to the photoconductive element 80, and the input light signal $\lambda'$ is directed to the photoconductive element 82.

When the inverter 20 is first activated by the alternating-current exciting potential from the alternating-current source, the relatively high resistance of both the photoconductive elements 80 and 82 causes the electroluminescent elements 84 and 86 both to luminesce. The feedback light signal $\lambda_f$ from the electroluminescent element 86 immediately causes the resistance of the photoconductive element 80 to decrease to a level, such that the potential across the electroluminescent element 84 drops to a level to extinguish that element.

Therefore, the inverter 20 assumes a first stable state, when the input signal $\lambda'$ has minimum or zero amplitude, such that the electroluminescent element 86 luminesces to cause the light signal $\overline{\lambda'}_A$ to be true, and in which the electroluminescent element 84 is extinguished to cause the light signal $\lambda'_A$ to be false.

When the input signal $\lambda'$ assumes maximum amplitude, the resulting decrease in the resistance of the photoconductive element 82 causes the electroluminescent element 86 to become extinguished. This causes the resistance of the photoconductive element 80 to increase, so that the electroluminescent element 84 again becomes luminescent.

Therefore, in the presence of maximum amplitude of the input light signal $\lambda'$, the inverter 20 assumes a condition in which the light signal $\overline{\lambda'}_A$ is false, and in which the light signal $\lambda'_A$ is true.

The inverter 20 may have physical characteristics, such as shown by the schematic diagram of FIGURE 6. The photoconductive elements 80 and 82 of the inverter are mounted on a suitable transparent substrate 83, and the electroluminescent elements 84 and 86 are mounted on a suitable transparent substrate 85. The substrates 83 and 85 are supported in any suitable manner in an appropriate housing in spaced and parallel relationship. A first opaque shield 87 is provided adjacent the substrate 83 and in position such that the input light signal $\lambda'$ activates only the photoconductive element 82. A similar opaque shield 89 is provided between the substrates 83 and 85 in position such that the feedback light $\lambda_f$ from the electroluminescent element 86 activates only the photoconductive element 80.

With the physical positioning of the elements, as shown by the schematic diagram of FIGURE 6, and with the electrical connections, as shown by the diagram of FIGURE 5, the inverter 20 performs its desired complementing function, as described, to produce the output signals $\lambda'_A$ and $\overline{\lambda'}_A$ in response to the changes of state of the input light signal $\lambda'$.

As shown in FIGURE 7, the binary-to-decimal translator 60 may be formed of three substrates 100, 102 and 104. The substrate 100 actually forms the output of the inverters 50, 52, 54 and 56 of FIGURE 4. The electroluminescent output elements of the inverters are formed in adjacent strips on the common substrate 100, and respective ones of these strips luminesce as the corresponding light signals $\lambda'_A$, $\overline{\lambda'}_A$, $\lambda^2_A$, $\overline{\lambda^2}_A$, $\lambda^3_A$, $\overline{\lambda^3}_A$, $\lambda^4_A$, $\overline{\lambda^4}_A$ become true.

The second substrate 102 in the binary-to-decimal translator 60 is in the form of a mask. The third substrate 104 is transparent, and groups of photoconductive elements are mounted on the substrate 104. The three substrates are mounted in the translator one over the other. The groups of photoconductive elements on the substrate 104 individually contain, for example, four photoconductive elements which, in turn, are connected in series. All the groups of photoconductive elements have a first terminal connected to a common lead 106 which, in turn, connects with the alternating-current source. The other terminals of each of the groups are brought out to respective output terminals 0, 1, 2, 3, 4, 5, 6, 7, 8 and 9.

The photoconductive elements in each of the groups on the substrate 104 are formed to constitute an "and" gate. Before a low resistance path is established between the corresponding one of the output terminals 0–9 and the alternating-current source, light must be incident on all of the photoconductive units in the corresponding group. The arrangement is such that different patterns of illumination of the electroluminescent strips on the substrate 100 produce respective low resistance paths between different ones of the decimal output terminals 0–9 and the alternating-current source.

Figure 8:
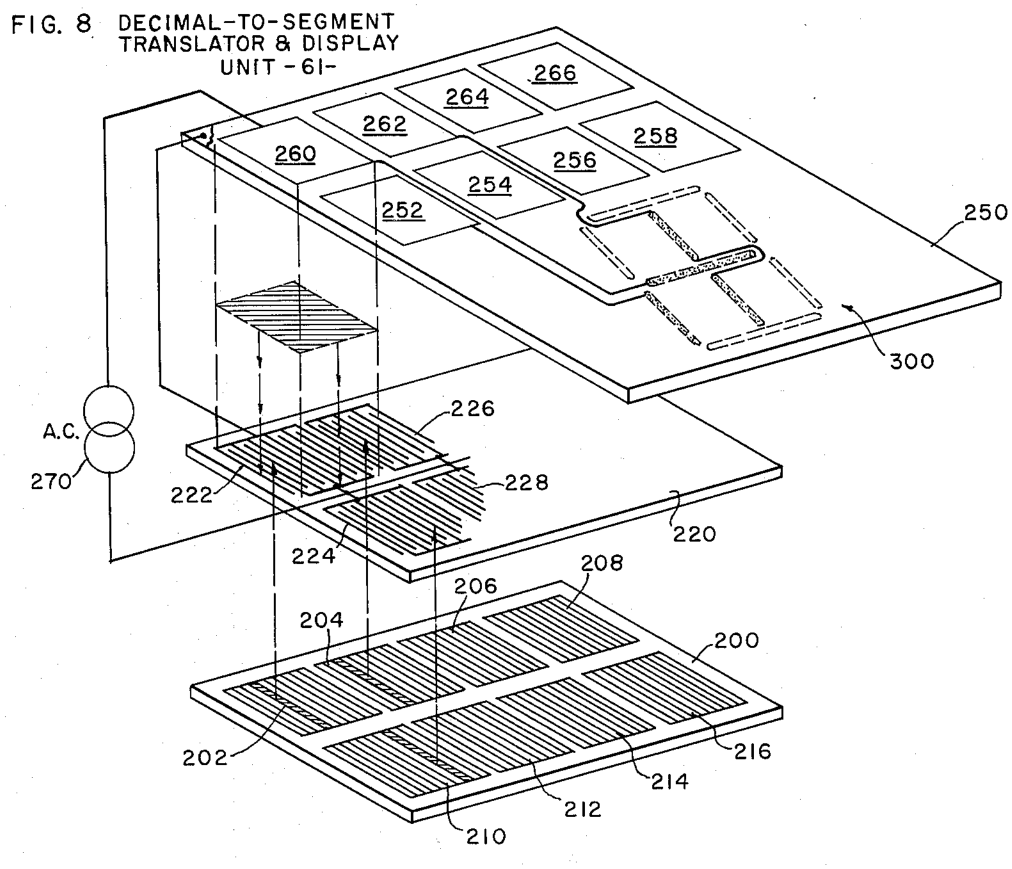
FIGURE 8 is a perspective, exploded view of a photoconductive-electroluminescent memory and demical-to-segment translator for use in the system of FIGURE 4.

The decimal-to-segment translator and display unit 61 is shown in more detail in FIGURE 8. The unit includes a first substrate 200 which has a plurality of electroluminescent elements formed thereon. The electroluminescent elements on the substrate 200 are formed as a series of rectangles designated 202, 204, 206, 208, 210, 212, 214 and 216. Each of the rectangles includes a plurality of strip-shaped electroluminescent elements which are independent of one another. In the illustrated embodiment, each of the rectangles includes ten individual and independent adjacent strip electroluminescent elements.

The electroluminescent elements in each of the rectangles 202, 204, 206, 208, 210, 212, 214 and 216 constitute an "or" gate. The electrical output leads from the output terminals 0–9 of the binary-to-decimal translator 60 of FIGURE 7 are connected to the different electroluminescent strip elements forming the various "or" gates, and in a predetermined wiring configuration. This wiring configuration is represented, for example, by the table of FIGURE 10.

Figures 10, 11:
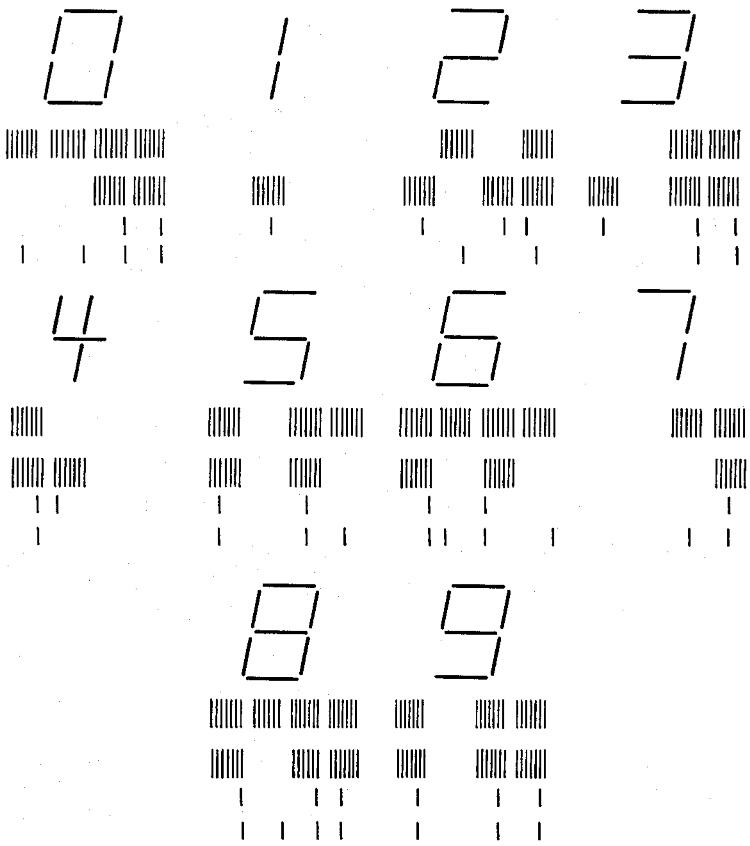
FIGURE 10 is a table relating the activated memory segments of the unit of FIGURE 9 to different numeric representations.
FIGURE 11 is a schematic representation of the manner in which the different decimal numeric characters are formed in the display of FIGURE 9.

As indicated by the table of FIGURE 10, the zero output terminal of the binary-to-decimal translator 60 is electrically connected to electroluminescent strips in the rectangles 202, 204, 206, 208, 210 and 212 on the substrate 200. In like manner, the output terminal 1 of the translator 60 is electrically connected to an electroluminescent strip on the rectangle 214. The output terminal 2 of the translator 60 is connected to different electroluminescent strips in the rectangles 202, 204, 208, 212 and 216. Likewise, the output terminals 3–9 of the translator 60 are connected to different ones of the electroluminescent strips in the rectangles on the substrate 200 of FIGURE 8, as indicated by the "X's" in the table of FIGURE 10.

The decimal-to-segment translator and display unit 61 of FIGURE 8 also includes a substrate 220, and the latter substrate has a plurality of photo-conductive elements mounted thereon in respective alignment with the electroluminescent rectangles 202, 204, 206, 208, 210, 212, 214 and 216 on the substrate 200. Certain ones of the photo-conductive elements on the substrate 220 are indicated 222, 224, 226 and 228.

The decimal-to-segment translator and display unit 61 also includes a third substrate 250 which is mounted adjacent the substrate 220. It will be appreciated that the three substrates 200, 220 and 250 are mounted as a unit, with the substrate 220 being sandwiched between the other two.

The substrate 250 has a plurality of rectangular electroluminescent elements mounted thereon in respective alignment with the photo-conductive elements on the substrate 220, such as the photo-conductive elements 222, 224, 226 and 228. These latter electroluminescent elements form memory elements, and are designated respectively as 252, 254, 256, 258, 260, 262, 264 and 266.

The memory elements on the substrate 250 are so disposed relative to the photo-conductive elements on the substrate 220, that the activation of one of the photo-conductive elements on the substrate 220 causes the corresponding aligned electroluminescent memory element on the substrate 250 to luminesce, and the resulting luminescence from the memory element is directed back to the exciting photo-conductive element, so as to maintain the photo-conductive element in its low resistance state which, in turn, maintains the corresponding memory element in a condition of luminescence.

To achieve the purpose described in the preceding paragraph, each photo-conductive element on the substrate 220 is connected in series with its corresponding memory electroluminescent element on the substrate 250 across the alternating-current source. For example, and as shown in FIGURE 8, the photo-conductive element 220 is connected in series with the electroluminescent element 260 across an appropriate alternating current source 270. In like manner, the individual electroluminescent strips on the substrate 200 are connected in series between the corresponding output terminals of the translator 60 of FIGURES 4 and 7 and ground.

Figure 9:
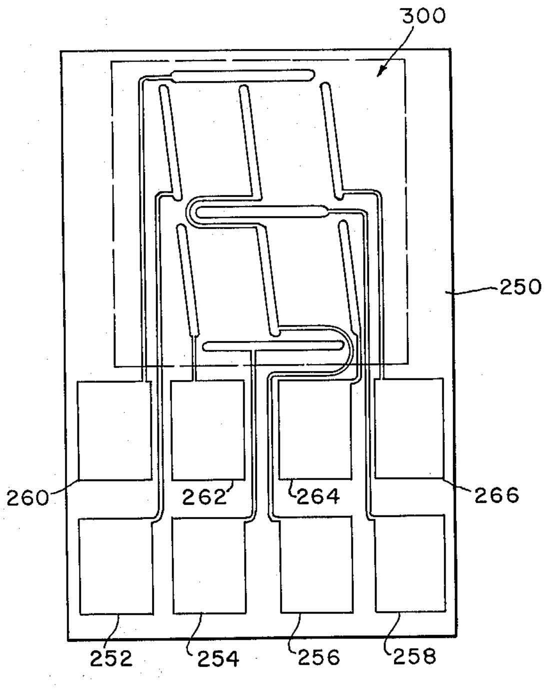
FIGURE 9 is a plan view of the display and memory surface of the display unit embodying the principles of the invention.

As best shown in FIGURE 9, the various electroluminescent memory elements 252, 254, 256, 258, 260, 262, 264 and 266 on the substrate 250 are connected to different segments of an electroluminescent display 300. The display 300 is composed of a plurality of strip-like electroluminescent segments which are mounted on the substrate 250 and which luminesce when the memory element to which the particular display element is connected luminesces.

An examination of the table of FIGURE 10 will reveal that the activation of a particular electroluminescent strip in the various rectangles on the substrate 200 will, by activation of the corresponding photo-conductive elements on the substrate 220, and by the resulting activation of the corresponding electroluminescent memory elements on the substrate 250, produce an illumination of selected segments of the display 300 to cause the display to exhibit a numeral corresponding to the particular output from the binary-to-decimal translator 60.

The displays of FIGURE 11 designate the manner in which the different decimal numeric characters may be formed on the display 300. In each instance, the illuminated rectangles immediately under the corresponding display number represents the activated electroluminescent memory elements on the substrate 250, and the illuminated strips under the corresponding illuminated rectangles designate the activated electroluminescent elements on the substrate 200.

It will be appreciated that a momentary illumination of a pattern of electroluminescent strips on the substrate 200 will, due to the interaction of the electroluminescent elements on the substrate 250 with the photoconductive elements on the substrate 220, illuminate a corresponding numeric character on the display 300, which character will continue to be illuminated even after the removal of the input signals to the electroluminescent elements on the substrate 200. The persistence of the display is due to the memory action between the electroluminescent elements on the substrate 250 which causes the corresponding photoconductive elements on the substrate 220 to remain activated until the alternating-current connection is broken.

It is apparent that appropriate design of the binary-to-decimal translator 60 and by appropriate connections to the display unit 61, alphanumeric or other displays may be realized.

The invention provides, therefore, an improved and simplified read-out system for converting binary or other input data into a visual display. As described above, the read-out system is advantageous in that the entire conversion is made by the use of logic and other components using electroluminescent and photoconductive elements entirely.

The read-out system of the invention is advantageous in that it can be constructed as a relatively small package and in a relatively simple, inexpensive and economical manner.

While a particular embodiment of the invention has been shown and described, modifications may be made. It is intended in the following claims to cover all such modifications as fall within the scope of the invention.

What is claimed is:

1. A binary data read-out and display system including: a binary data source producing a plurality of light signals respectively representing the different binary digits of the data; a light inverter means optically coupled to said source for producing a true light signal and a complemented light signal in response to each of the light signals from said source; a light binary-to-decimal translator means having a plurality of output terminals and optically coupled to said light inverter means and responsive to the true and complemented light signals therefrom for providing electrical output signals at different ones of said output terminals corresponding to the decimal equivalents of the binary digits represented by the light signals from said source; and decimal-to-segment translator means electrically coupled to the respective output terminals of said binary-to-decimal translator means and responsive to the electrical output signals at said output terminals for providing an illuminated indication of the decimal equivalents of the binary data from said source.

2. A binary data read-out and display system including: a binary data source producing a plurality of light signals respectively representing the different binary digits of the data and each having a first and a second amplitude level; light amplifier means optically coupled to said source for amplifying the respective light signals therefrom; light inverter means optically coupled to said light amplifier means for producing a true light signal and a complemented light signal in response to each of the amplified light signals from said amplifier means; a light binary-to-decimal translator means having a plurality of output terminals and optically coupled to said light inverter means and responsive to the true and complemented light signals therefrom for providing electrical output signals at different ones of said output terminals corresponding the decimal equivalents of the binary digits represented by the light signals from said source; and decimal-to-segment translator means electrically coupled to the respective output terminals of said binary-to-decimal translator means and responsive to the electrical output signals at said output terminals for providing an illuminated indication of the decimal equivalents of the binary data from said source.

3. The read-out and display system of claim 2 in which said light amplifier means includes: photoconductive means disposed in the path of said light signal from said source and exhibiting first and second electrical resistance values in response thereto; electroluminescent means connected in circuit with said photoconductive means; and means for introducing an alternating-current exciting potential to said electro-luminescent means and to said photoconductive means to cause said electroluminescent means to luminesce when said photoconductive means exhibits said second resistance value.

4. The read-out and display system of claim 2 in which said light inverter means includes: first and second photoconductive members, first and second electroluminescent members respectively connected to said first and second photoconductive members; means for introducing an alternating current exciting potential to said first and second photo-conductive members and to said first and second electro-luminescent members to cause said electroluminescent members initially to luminesce, said first photoconductive member responding to one of the light signals from said amplifier means and said second photoconductive member responding to the light from said first electroluminescent member to cause said second electroluminescent member to be extinguished when the corresponding light signal from said source has said first amplitude value and to cause said first electroluminescent member to be extinguished and said second electroluminescent member to luminesce when the corresponding light signal from said source has said second amplitude value; and means for introducing an alternating-current exciting potential to said first and second photoconductive members and to said first and second electroluminescent members.

5. The binary data read-out and display system defined in claim 1 in which said decimal-to-segment translator means includes a plurality of groups of independent electroluminescent elements, the electroluminescent elements in each of said groups being coupled selectively to said output terminals of said binary-to-decimal translator means and responsive to electrical output signals therefrom to provide selective luminescent effects in said decimal-to-segment translator means; a plurality of photoconductive elements optically coupled to corresponding ones of said last mentioned groups of electroluminescent elements, and electroluminescent segments connected in circuit with corresponding ones of said last mentioned photoconductive elements to provide a display in response to the luminescence of said aforementioned electroluminescent elements in selected ones of said groups.

6. The combination defined in claim 5 in which said decimal-to-segment translator means includes a plurality of further electroluminescent elements connected to respective ones of said photo-conductive elements and in position for regeneratively directing luminescence back to corresponding ones of said photoconductive elements to provide a memory effect in said decimal-to-segment translator means.

7. In a binary data read-out and display system which includes a binary data source for producing a plurality of light signals respectively representing the different binary digits of the data, a light inverter means optically coupled to said source for producing a true light signal and a complemented light signal in response to each of the light signals from said source, a light binary-to-decimal translator means having a plurality of output terminals and optically coupled to said light inverter means and responsive to the true and complemented light signal therefrom for providing electrical output signals at different ones of said output terminals corresponding to the decimal equivalents of the binary digits represented by the light signals from said source, a decimal-to-segment translator means coupled to the respective output terminals of said binary-to-decimal translator means and responsive to the electrical output signals at said output terminals for providing an illuminated indication of the decimal equivalents of the binary data from said source, said decimal-to-segment translator means including; a plurality of graups of independent electroluminescent elements, the electroluminescent elements in each of said groups being coupled selectively to said output terminals of said binary-to-decimal translator means and responsive to electrical output signals therefrom to provide selective luminescent effects in said decimal-to-segment translator means; a plurality of photoconductive elements optically coupled to corresponding ones of said last mentioned groups of electroluminescent elements, and electroluminescent segments connected in circuit with corresponding ones of said last mentioned photoconductive elements to provide a display in response to the luminescence of said aforementioned electroluminescent elements in selected ones of said groups.

8. The combination defined in claim 7 in which said decimal-to-segment translator means includes a plurality of further electroluminescent elements connected to respective ones of said photoconductive elements and in position for regeneratively directing luminescence back to corresponding ones of asid photoconductive elements to provide a memory effect in said decimal-to-segment translator means.

References Cited by the Examiner

UNITED STATES PATENTS

| | | | |
|---|---|---|---|
| 2,907,001 | 9/59 | Loebner | 250—213 |
| 2,920,232 | 1/60 | Evans | 315—169 |
| 2,930,896 | 3/60 | Raymond | 250—213 |
| 2,954,476 | 9/60 | Ghanhdi | 250—213 |
| 3,020,410 | 2/62 | Bowerman | 250—213 |
| 3,031,579 | 4/62 | Hook et al. | 250—213 |
| 3,046,540 | 7/62 | Litz et al. | 250—213 |
| 3,078,373 | 2/63 | Wittenberg | 313—108 |
| 3,087,068 | 4/63 | Bowerman | 250—209 |

OTHER REFERENCES

Greenberg: Electroluminescent Display and Logic Devices, Electronics, March 24, 1961, pages 31 to 35.

RALPH G. NILSON, *Primary Examiner.*

ARTHUR GAUSS, *Examiner.*